US008873683B2

(12) United States Patent
Balraj et al.

(10) Patent No.: US 8,873,683 B2
(45) Date of Patent: Oct. 28, 2014

(54) INTERFERENCE AND NOISE ESTIMATION IN A MULTIPLE INPUT MULTIPLE OUTPUT (MIMO) RECEIVER

(71) Applicant: Intel Mobile Communications GmbH, Neubiberg (DE)

(72) Inventors: Rajarajan Balraj, Duesseldorf (DE); Biljana Badic, Duesseldorf (DE); Tobias Scholand, Muelheim (DE)

(73) Assignee: Intel Mobile Communications GmbH, Neibiberg (DE)

( * ) Notice: Subject to any disclaimer, the term of this patent is extended or adjusted under 35 U.S.C. 154(b) by 70 days.

(21) Appl. No.: 13/707,779

(22) Filed: Dec. 7, 2012

(65) Prior Publication Data

US 2014/0161157 A1    Jun. 12, 2014

(51) Int. Cl.
*H04B 1/10*        (2006.01)
*H04B 1/711*       (2011.01)

(52) U.S. Cl.
CPC ...................................... *H04B 1/711* (2013.01)
USPC .......... 375/346; 375/144; 375/148; 455/63.1; 455/114.2; 455/278.1; 455/296; 455/501

(58) Field of Classification Search
USPC ............... 375/144, 148, 346; 455/114.2, 501, 455/63.1, 278.1, 296
See application file for complete search history.

(56) References Cited

U.S. PATENT DOCUMENTS

2013/0208604 A1*   8/2013   Lee et al. ........................ 370/252
2014/0056265 A1*   2/2014   Koivisto et al. ............... 370/329

FOREIGN PATENT DOCUMENTS

WO    WO 2012/093953 A2 *   7/2012   ................ H04L 5/00

OTHER PUBLICATIONS

LTE; Evolved Universal Terrestrial Radio Access (E-UTRA); Physical Channels and Modulation (3GPP TS 36.211 Version 10.4.0 Release 10); ETSI TS 136 211 v10.4.0 Jan. 2012.
"Discussion on DM-RS for Enhanced DL Beamforrning"; 3GPP TSG RAN WG1 #58bis, Miyazaki, Japan, Oct. 12-16, 2009, p. 1-4.
"DMRS for MU-MIMO"; 3GPP TSG RAN WG1#61bis; Dresden, Germany Jun. 28-Jul. 2, 2010, p. 1-11.

* cited by examiner

*Primary Examiner* — Sophia Vlahos
(74) *Attorney, Agent, or Firm* — Eschweiler & Associates, LLC

(57) ABSTRACT

A receiver circuit receives a signal including a first reference signal from a first antenna port that is allocated to the UE. The receiver circuit includes a descrambling and despreading unit that despreads and descrambles the signal using a spreading code of the first antenna port and a scrambling sequence assigned to the UE to generate a first antenna port signal. The descrambling and despreading unit despreads and descrambles the signal using a spreading code of a second antenna port and the scrambling sequence assigned to the UE, wherein the second antenna port is unallocated to the UE to generate a second antenna port signal. A channel estimator generates a channel estimate of the first antenna port based on the first antenna port signal. An estimation unit estimates an interference and noise covariance measure based on the first antenna port signal, the channel estimate and the second antenna port signal.

25 Claims, 6 Drawing Sheets

INTERFERENCE AND NOISE ESTIMATION IN A MULTIPLE INPUT MULTIPLE OUTPUT (MIMO) RECEIVER

FIELD

The invention relates to the field of radio communications, and more particularly to the technique of transmitting and detecting signals in multiple-antenna transmission systems of radio networks, in particular cellular radio networks.

BACKGROUND

In radio communications systems multiple User Equipments (UEs) may share the same frequency and time resource such that mutual interference may occur. Receiver circuits and methods for detecting data performed by receiver circuits constantly have to be improved. In particular, it may be desirable to improve the reception quality and performance of mobile communications receivers in multi-user multiple input multiple output systems.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
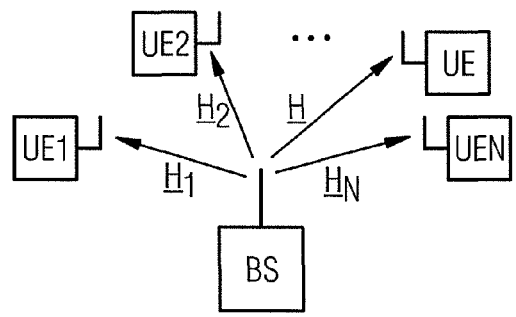
FIG. 1 schematically illustrates a configuration of a MIMO system.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, various methods and receiver circuits are described separately or with reference to each other. It is understood that comments made in connection with a described method may also hold true for a corresponding receiver circuit configured to perform the method and vice versa. For example, if a specific method step is described, a corresponding receiver circuit may include a unit to perform the described method step, even if such a unit is not explicitly described or illustrated in the figures.

The methods and receiver circuits described herein may be based on or may support arbitrary (in particular digital) modulation schemes for modulating data. For example, symbols of a received symbol stream may be modulated according to a Quadrature Amplitude Modulation (QAM) modulation scheme, a Binary Phase Shift Keying (BPSK) modulation scheme, a Quadrature Phase Shift Keying (QPSK) modulation scheme, a 8QAM modulation scheme, a 16QAM modulation scheme, a 64QAM modulation scheme or any other suitable modulation scheme.

The methods and receiver circuits described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). In particular, the methods and receiver circuits described herein may be used in the framework of mobile communication standards supporting multiple predefined modulation schemes or modulation alphabets. For example, the 3GPP Long Term Evolution (LTE) standard, which is based on the GSM/EDGE and UMTS/HSPA (High Speed Packet Access) technologies, supports QPSK, 16-QAM and 64-QAM. Similarly, each of WiMAX and Wireless LAN supports BPSK, QPSK, 16-QAM and 64-QAM.

In radio communications systems, a transmitter transmitting one or more radio communications signals over one or more radio communications channels is used. The transmitter may be a base station (BS) or a transmitting device included in a user's device, such as a mobile radio transceiver, a handheld radio device or any similar device. A base station may also be referred to as "NodeB" or "eNodeB". Radio communications signals transmitted by transmitters may be received by receivers such as a receiving device in a mobile radio transceiver or mobile station, a handheld radio device or any similar device. Receiver circuits as described herein may e.g. be included in such receivers. A mobile station may also be referred to as "User Equipment" (UE).

The methods and receiver circuits described herein may relate to a Multiple Input Multiple Output (MIMO) system providing the use of multiple antennas at both the transmitter and receiver. The methods and receiver circuits described herein may also relate to a system having only one antenna at the receiver. MIMO is a part of wireless communications standards such as e.g. IEEE 802.11n (Wi-Fi), 4G, 3GPP Long Term Evolution (LTE), WiMAX (specifically WiMAX 802.16e-2005) and HSPA+ (specifically Release 7 and following Releases). The methods and receiver circuits described herein may be operated in accordance with one or more of these standards or other standards.

The term "spatial multiplexing" as used herein corresponds to a transmission technique in MIMO wireless communication used to transmit independent and separately encoded data signals, so-called data streams, from different transmit antennas of a base station. Similarly, a UE may receive multiple transmitted data streams by means of a plurality of receive antennas. Such independent data streams are also referred to as "layers" in the art. The encoding of data in spatial multiplexing may be based on an open-loop approach or a closed-loop approach.

When the individual data streams (layers) are assigned to a single user, this is called Single-User (SU) MI MO. Otherwise, when the individual data streams (layers) are assigned to various users, this is called Multi-User (MU) MIMO. The benefit of using MU-MIMO transmission is the naturally independent signals cross the receive antennas mounted over physically distributed UEs. MU-MIMO schemes allow multiple UEs to share the same resource in e.g. frequency and time domains, i.e. the same resource blocks, and multiplex their signals on the spatial domain. MU-MIMO may be regarded as an extended version of the Space-Division Multiple Access (SDMA) scheme. In 3G/HSPA MU-MIMO, the UEs may also share the same resource in e.g. time and channelization code (e.g. Orthogonal Variable Spreading Factor (OVSF)/Spreading Code).

For MU-MIMO, a base station may schedule a set of UEs for a data transmission with MU-MIMO. Transmission data is then transmitted from the base station to the scheduled UEs simultaneously and on the same resource element. During a data transmission interferences between data streams (layers) transmitted from the base station to the co-scheduled UEs may occur. In MU-MIMO, for an appropriate detection of data symbols received at a target UE or allocated UE (i.e. the UE of the user of interest), it may be helpful to suppress interference from co-scheduled UEs (i.e. interfering UEs). Note that the terms "target UE/allocated UE" and "co-scheduled UE/interfering UE" do not refer to an identical UE, but correspond to different mobile stations of different and typically remote users. A data stream (layer) assigned to the interfering UE may cause inter layer interference at the target UE. In order to mitigate inter layer interference, data symbols scheduled for an interfering UE may be detected at the target UE. The detection may be based on or may include a Maximum Likelihood (ML) algorithm or a Near ML algorithm such as e.g. a sphere decoder, QRD-M, SIC, etc.

FIG. 1 is a schematic illustration of a configuration of a SU- or MU-MIMO system with one base station BS. The MIMO system could transmit L data streams (layers) to N users (mobile stations UEn, n=1, 2, ..., N) at e.g. the same time and frequency resource. L and N are integers with L≥N. Here, the MIMO channel matrix of the $n^{th}$ user is denoted by $H_n$. For the sake of ease of notation, the MIMO channel matrix of the user of interest (target UE) is simply written as H, i.e. without index.

Since MU-MIMO aims to transmit data streams of multiple users at the same resources (e.g. time and frequency resources), without loss of generality, the representation used below is described by way of example at a single-carrier, e.g. for each subcarrier of a multi-carrier system such as OFDM.

BS may e.g. be equipped with $N_{Tx}$ transmit antennas and the target UE may be equipped with $N_{Rx}$ receive antennas. Thus, H may be represented by a $N_{Rx} \times N_{Tx}$ matrix. The other UEs assigned to other users (i.e. {UE1, UE2, ... $UE_N$} \ {UE}) may e.g. also be equipped with e.g. $N_{Rx}$ receive antennas. In this case, each MIMO channel matrix $H_n$ is of dimension $N_{Rx} \times N_{Tx}$.

Downlink reference signals are predefined signals that occupy specific resource elements in the downlink time-frequency grid. The demodulation reference signals (DM-RS) are one type of downlink reference signals. They are intended to be used by terminals (UEs) for channel estimation for the physical downlink channel. By way of example, in LTE, they are used for channel estimation of the physical downlink shared channel PDSCH in the case of transmission modes (TM) TM7, TM8, or TM9. Demodulation reference signals (DM-RS) are also referred to as UE-specific reference signals. They may be used in connection with non-codebook based precoding, when cell-specific reference signals may not be used.

DM-RS were first introduced in the first release of LTE, which is 3GPP-Release 8. In Release 8, the DM-RS of TM7 was limited to single layer transmission, i.e. with no spatial multiplexing. TM8 and TM9, which were introduced in Release 9 and in Release 10, respectively, support rank-1 SU-MIMO, i.e. using one layer, and MU-MIMO for up to four co-scheduled UEs, i.e. up to four layers. For the sake of explanation, reference is made to LTE. However, even if LTE terms such as, e.g., DM-RS, PDSCH etc. are used herein, it is to be understood that the disclosure is more general and is not confined to LTE.

Figure 2:
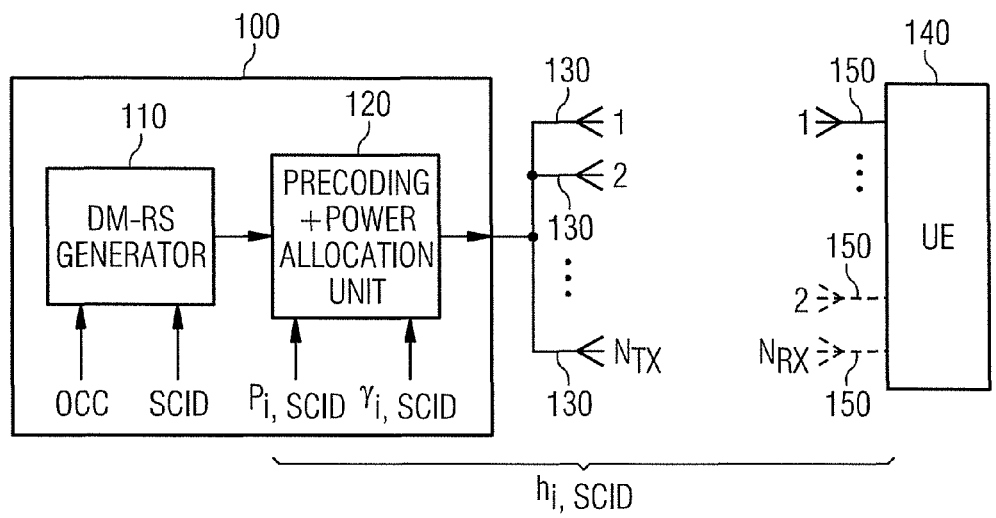
FIG. 2 schematically illustrates a block diagram of a MIMO system which is configured to generate a demodulation reference signal (DM-RS) for one layer.

As shown in FIG. 2, for each data stream or layer which is transmitted by the BS, the BS may e.g. be equipped with a unit 100 which generates precoded and power allocated UE-specific reference signals, e.g. DM-RSs. According to FIG. 2 a UE-specific reference signal generator, referred to as DM-RS generator 110, generates complex reference symbols $a_{i,SCID}$ as DM-RSs, wherein each complex reference symbol $a_{i,SCID}$ is assigned to a layer having an index i, with i being an integer between 1 and L, an orthogonal spreading code such as, e.g. an orthogonal cover code (OCC), and an UE-specific scrambling sequence having an index SCID. In particular $a_{i,SCID}$ may comprise a product of the OCC and the scrambling sequence.

The complex reference symbols $a_{i,SCID}$ may then be precoded and power allocated in the precoding and power allocation unit 120. By precoding, layers are mapped to antenna ports. More specifically, each symbol of a layer is multiplied with complex weights to adjust the amplitude and phase of the signal to and from each antenna. Precoding may be used for multi-stream beamforming in the desired directions to increase the received signal gain at the respective UE to which a data stream is assigned. To this end, precoding may use knowledge of channel state information (CSI) at the transmitter (i.e. BS).

By power allocation, each DM-RS may be scaled by a factor related to its relative power. The factors of the power allocation may be incorporated in the coefficients of the precoding vector.

Each DM-RS is directed towards an individual UE by e.g. beamforming techniques. The number of layers may e.g. be equal to or greater than the number of DM-RS. The number of layers may e.g. be the same as or greater than the number of antenna ports. Antenna ports referred to above do not necessarily correspond to specific physical antennas. An antenna port may be understood to correspond to the transmission of a DM-RS. A somewhat more general definition as used in the LTE specification is that two received signals can be assumed to have experienced the same overall channel if and only if they have been transmitted on the same antenna port.

After precoding and power allocation of the signal in the precoding and power allocation unit 120, the signal is transmitted from $N_{Tx}$ transmit antennas 130 to the UE 140 having $N_{Rx}$ receive antennas 150. The signal which is received by the receive antennas 150 is despread and descrambled in the UE 140.

By way of example, for the case of a two layer transmission over two antenna ports p (7 and 8) for two scrambling sequences having two scrambling IDs SCIDs (0 and 1), the system function $y_{DM-RS}$ for the DM-RSs which are transmitted over the channel may be expressed as follows:

$$y_{DM-RS} = H \sum_{p=7}^{8} \sum_{SCID=0}^{1} \gamma_{p,SCID} P_{p,SCID} a_{p,SCID} + n \qquad (1)$$

$$= \sum_{p=7}^{8} \sum_{SCID=0}^{1} h_{p,SCID} a_{p,SCID} + n$$

Here $\gamma_{p,SCID}$ is the power allocated by the BS to the DM-RS having antenna port p and scrambling ID SCID, $P_{p,SCID}$ is the precoding vector for antenna port p and scrambling ID SCID, n denotes noise, for example additive white Gaussian noise (AWGN) having a variance of $\sigma_n^2$, and $h_{p,SCID}$ is the effective channel for antenna port p and scrambling ID SCID.

In the case when two layers are transmitted, two antenna ports and a single scrambling sequence may be used. Two antenna ports using the same scrambling sequence are orthogonal. This case may be called an orthogonal DM-RS case.

Figure 3:
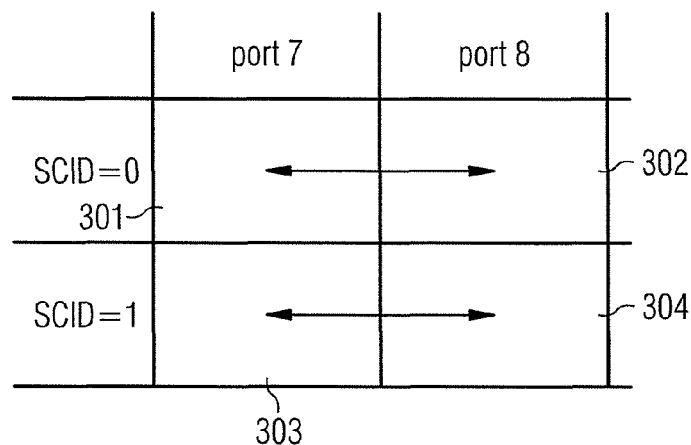
FIG. 3 schematically illustrates an exemplary allocation of layers to a configuration of two antenna ports and two used scrambling IDs.

The situation for a transmission with two antenna ports using two scrambling sequences for the case when more than two and up to four layers are used is illustrated in FIG. 3. Four quadrants 301, 302, 303 and 304 represent the different layers which may be used. The two quadrants on the left 301 and 303 represent the layers using antenna port 7, wherein layer of quadrant 301 uses scrambling ID SCID 0 and layer of quadrant 303 uses scrambling ID SCID 1. The two quadrants on the right 302 and 304 represent the layers using antenna port 8, wherein layer of quadrant 302 uses scrambling ID SCID 0 and layer of quadrant 304 uses scrambling ID SCID 1. The arrows between the quadrants each indicate an orthogonal relationship. The signal of antenna port 7 using scrambling sequence with scrambling ID SCID 0 is orthogonal to the signal of antenna port 8 using the same scrambling sequence with scrambling ID SCID 0. The signal of antenna port 7 using scrambling sequence having scrambling ID SCID 1 is orthogonal to the signal of antenna port 8 using the same scrambling sequence with scrambling ID SCID 1. However, all the other layers are not orthogonal to each other, that is, antenna port 7 with SCID 0 is not orthogonal to antenna port 7 with scrambling ID SCID 1 and not orthogonal to antenna port 8 having scrambling ID SCID 1 and antenna port 8 having scrambling ID SCID 0 is not orthogonal to antenna port 8 having scrambling ID SCID 1 and antenna port 7 having scrambling ID SCID 1. This configuration may be called non-orthogonal DM-RS.

In the case when two layers are transmitted to a first UE and two layers are transmitted to a second UE which is co-scheduled with the first UE, it is possible to use the antenna ports 7 and 8 with scrambling ID SCID 0 for the two layer transmission to the first UE and the antenna ports 7 and 8 with scrambling ID SCID 1 for the two layer transmission to the co-scheduled second UE.

Figure 4:
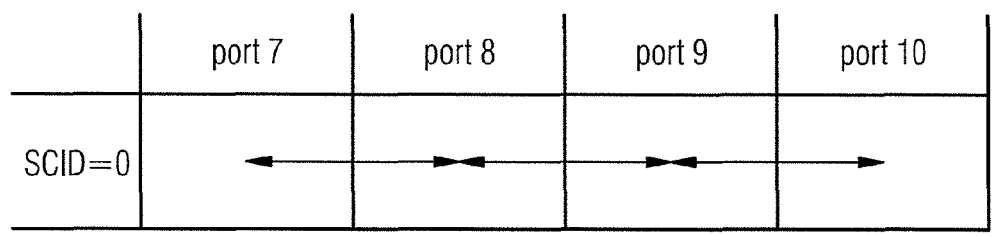
FIG. 4 schematically illustrates an exemplary allocation of layers to a configuration of four antenna ports and one used scrambling ID.

FIG. 4 illustrates another configuration for four antenna ports 7, 8, 9 and 10 using a single scrambling ID, e.g. the scrambling ID 0. Similar to the configuration of FIG. 3, the transmitted signals of the antenna ports 7, 8, 9 and 10 having the scrambling ID SCID 0 are orthogonal to each other. The orthogonality between different layers is indicated by the arrows in FIG. 4. For simplicity the arrows are only depicted between antenna port 7 and 8, 8 and 9, and 9 and 10. However it is to be understood that also antenna port 7 is orthogonal to antenna port 9 and antenna port 10 and antenna port 8 is also orthogonal to antenna port 10. In this configuration up to four layers may be transmitted to at least one UE. According to one possibility, one layer may be transmitted to an allocated UE1 while three layers are transmitted to a second co-scheduled UE2. According to another possibility, two layers may be transmitted to an allocated UE1 using antenna ports 7 and 8 while antenna ports 9 and 10 are not allocated. By way of example, the configurations shown in FIG. 3 or 4 allow e.g. for single user (SU) dual-layer beamforming for 2×2 MIMO, two UE dual-layer beamforming using orthogonal and quasi-orthogonal DM-RS and four UE single-layer beamforming using orthogonal and quasi-orthogonal DM-RS.

Figure 5:
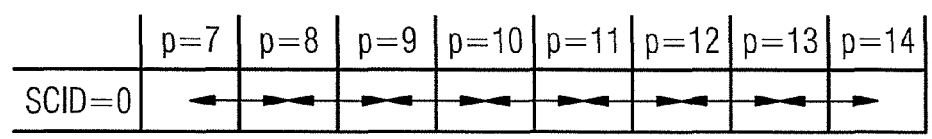
FIG. 5 schematically illustrates an exemplary allocation of layers to a configuration of eight antenna ports and one used scrambling ID.

FIG. 5 illustrates a similar configuration as in FIG. 3 or FIG. 4. A difference is, however, that up to eight antenna ports with one scrambling ID (SCID=j) may be used as stipulated e.g. in LTE Release 10. FIG. 5 shows the eight antenna ports 7 to 14. Similar to the configurations of FIGS. 3 and 4, the transmitted signals of the antenna ports 7 to 14 having the same scrambling ID SCID are orthogonal to each other. The orthogonality between different layers is indicated by the arrows in FIG. 5. In this configuration up to eight layers may be transmitted. By way of example, this allows e.g. for single user (SU) 8-layer beamforming for 8×8 MIMO.

It is to be noted that the above configurations are merely examples and other possibilities to use a plurality of antenna ports in combination with e.g. one or a plurality of scrambling codes are feasible for the transmission of multiple layers to one or a number of co-scheduled UEs.

That is, for simultaneous transmission of e.g. more than two or four layers, different scrambling sequences are used which cause interference to other layers and deteriorate the channel estimation performance due to increased interference between ports.

Figure 6:
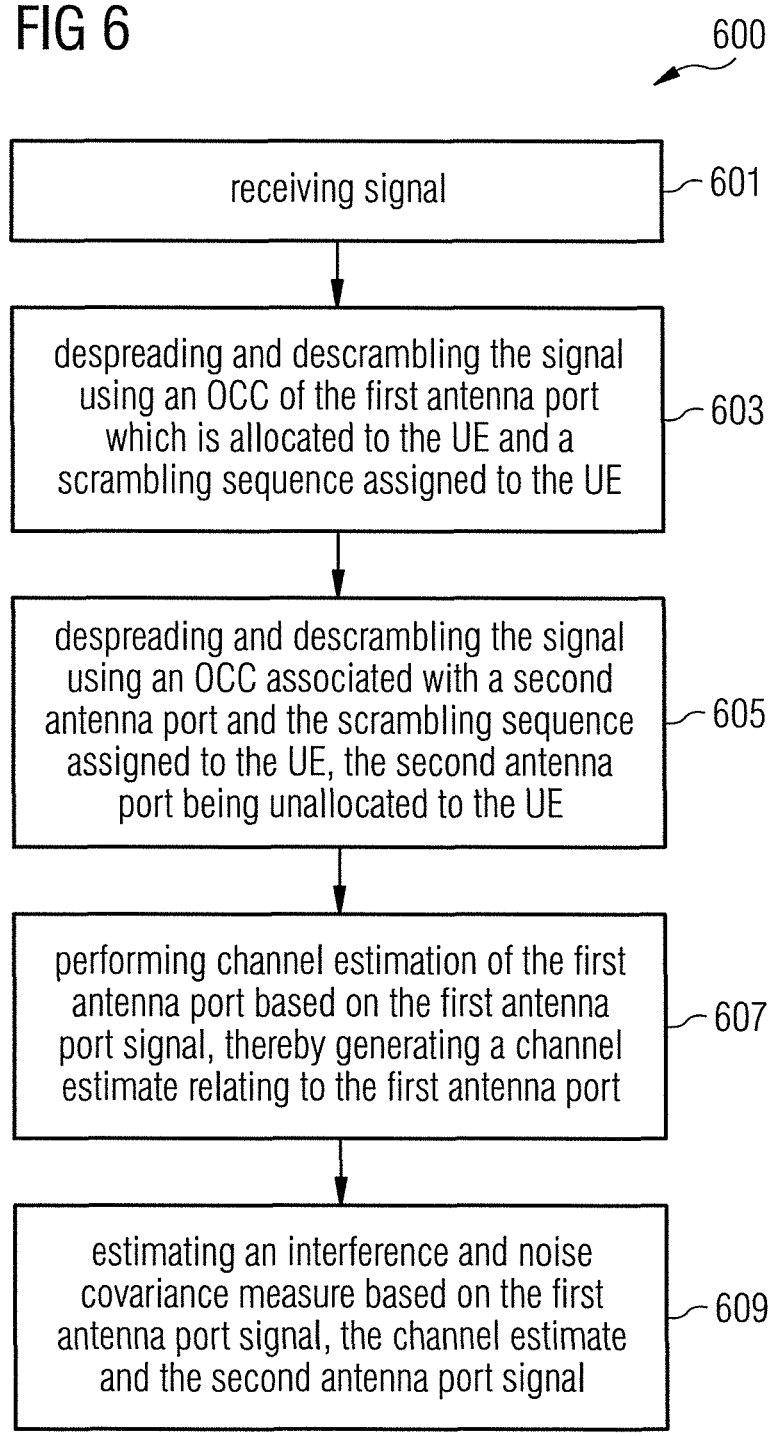
FIG. 6 schematically illustrates an exemplary method of estimating interference and noise in a multiple input multiple output (MIMO) receiver of a UE.

FIG. 6 is a flow diagram of an exemplary method 600 of estimating interference and noise in a MIMO receiver of a UE. The method 600 can be applied to a UE, in particular in a UE which may be used in a LTE network.

The method 600 may include at 601 receiving a signal including a first reference signal transmitted from a first antenna port, the first antenna port being allocated to the UE. The method 600 may further include at 603 despreading and descrambling the signal using a spreading code, e.g. an OCC, associated with the first antenna port and a scrambling sequence assigned to the UE, thereby generating a first antenna port signal. The method 600 may further include at 605 despreading and descrambling the signal using a spreading code, e.g. an OCC, associated with a second antenna port and the scrambling sequence assigned to the UE, the second antenna port being unallocated to the UE, thereby generating a second antenna port signal. The method 600 may further include at 607 performing channel estimation of the first antenna port based on the first antenna port signal, thereby generating a channel estimate relating to the first antenna port. The method 600 may further include at 609 estimating an interference and noise covariance measure based on the first antenna port signal, the channel estimate and the second antenna port signal.

The method 600 thus estimates an interference and noise covariance measure, e.g. a covariance matrix, in particular an interference and noise covariance matrix, based on the first antenna port signal, the channel estimate relating to the first antenna port and the second antenna port signal. This means, that only for the first antenna port which is allocated to the UE a channel estimation is performed. Further, for determining or estimating the interference and noise covariance measure the unallocated second antenna port as a whole may be treated as noise and interference for the allocated first antenna port.

In the method at 601 the first reference signal may e.g. be a demodulation reference signal (DM-RS), in particular a DM-RS for demodulation of PDSCH. The UE performing method 600 may e.g. be compatible with a LTE network or a LTE-Advanced network. A single data stream (single layer) or multiple data streams (multi-layer) of the signal may e.g. be transmitted from the first antenna port to the UE.

The spreading code associated with the first antenna port and the spreading code associated with the second antenna port at 603 and 605 may e.g. be OCCs. A Walsh code may e.g. be used as OCC.

The scrambling sequences at 603 and at 605 may be scrambling sequences which are known in the art. The scrambling sequences may e.g. be identified by a scrambling ID SCID. The scrambling ID SCID of the first scrambling sequence may e.g. be 0 and the scrambling ID SCID of the second scrambling sequence may e.g. be 1. The scrambling sequences may not necessarily be orthogonal to each other. One specific scrambling sequence may be allocated to the target UE. It is also possible that the target UE has an allocated antenna port p using an allocated scrambling ID SCID and at the same time the co-scheduled UE uses the same allocated antenna port p with a different scrambling ID SCID.

The demodulated symbols of the reference signals, e.g. DM-RS, are denoted as $\hat{h}$. The demodulated symbols $\hat{h}$ may be designated with 2 indices. The first index may designate the used channel or antenna port. If an antenna port allocated to the target UE is designated, the first index may be designated as p if there is only one allocated antenna port and as $p_1, \ldots, p_{N_{AP}}$ if there are $N_{aAP}$ allocated antenna ports (AP). If an antenna port which is not allocated to the target UE is designated, the first index is written as q if there is only one unallocated antenna port and $q_1, \ldots, q_{uaAP}$ if there are $N_{uaAP}$ unallocated antenna ports (AP). The second index may designate the scrambling sequence, in particular a scrambling ID SCID, which may be an integer between 0 and $N_{SCID}-1$, wherein $N_{SCID}$ is the number of used scrambling sequences. The demodulated symbols for antenna port p using scrambling ID SCID equal to i, wherein i is an integer between 0 and $N_{SCID}-1$, may be denoted as $\hat{h}_{p,i}$.

In an exemplary implementation of the method 600 the second antenna port may e.g. be not allocated to another UE. In this case the power assigned to another UE is zero. This case is also known as SU-MIMO.

In another exemplary implementation of the method 600 the signal may e.g. comprise a second reference signal transmitted from the second antenna port and the second antenna port may be allocated to another UE. This case is also known as MU-MIMO.

The method at 603 and 605 may be performed regardless of the transmission mode, i.e. SU-MIMO or MU-MIMO. That is, no decision has to be made in method 600 whether or not a co-scheduled UE exists. This may facilitate operation because the target UE typically has no information about the transmission mode used. Further, the method at 603 and 605 may be performed regardless of the number of co-scheduled UEs in the case of MU-MIMO. This may also facilitate operation because the target UE typically has no information about the number of co-scheduled UEs in case of MU-MIMO.

Channel estimation of the first antenna port based on the first antenna port signal may e.g. be performed by channel estimation algorithms which are known in the art. The channel estimate of the demodulated symbol $\hat{h}$ may de denoted as $\tilde{h}$. The channel estimate of the demodulated symbols for antenna port p using scrambling ID SCID equal to i, wherein i is an integer between 0 and $N_{SCID}-1$, may be denoted as $\tilde{h}_{p,i}$.

The interference and noise covariance measure may e.g. be obtained by estimating a first interference and noise covariance measure related to the first antenna port based on the first antenna port signal and the channel estimates, estimating a second interference and noise covariance measure related to the second antenna port based on the second antenna port signal, and combining the first covariance measure and the second covariance measure. Combining the first covariance measure and the second covariance measure may e.g. include various statistical functions. Combining may e.g. include adding the first interference and noise covariance measure and the second interference and noise covariance measure.

Referring to FIG. 6 at 609, an estimation of the interference and noise covariance matrix $R_{p,i}$ of the allocated antenna port p=7 using a scrambling sequence with scrambling ID=i may be calculated according to the formula:

$$R_{p,i} = E((\hat{h}_{p,i} - \tilde{h}_{p,i})(\hat{h}_{p,i} - \tilde{h}_{p,i})^H) \quad (2)$$

where E denotes an expectation operator and H denotes hermitian conjugation.

An estimation of the interference and noise covariance matrix $R_{q,i}$ of the unallocated (i.e. not allocated to the target UE) antenna port q=8 using a scrambling sequence with scrambling ID SCID i may be calculated according to the formula:

$$R_{q,i} = E(\hat{h}_{q,i} \hat{h}_{q,i}^H) \quad (3)$$

The estimated interference and noise covariance matrix $\hat{R}_e$ may be calculated as the sum of $R_{p,i}$ and $R_{q,i}$:

$$\hat{R}_e = R_{p,i} + R_{q,i} \quad (4)$$

The estimated interference and noise covariance matrix $\hat{R}_e$ may be used by an interference rejection combiner (IRC) or a noise whitening filter to suppress both inter-cell and multiuser interference.

Equations (2) and (3) exemplify that channel estimation may only be performed for the allocated antenna port p or, if there are $N_{cAP}$ allocated antenna ports, for those allocated antenna ports $p_1, \ldots, p_{N_{AP}}$. Channel estimation is not needed for the unallocated antenna port q or, if there are $N_{uaAP}$ unallocated antenna ports, for those unallocated antenna ports $q_1, \ldots, q_{N_{uaAP}}$. This may lead to a reduced complexity compared and less channel estimation errors. Further, there are no requirements for advanced channel estimation schemes. Still further, as will be exemplified in more detail further below, no scenario detector to decide between SU-MIMO and MU-MIMO is required.

In the SU-MIMO case, where e.g. only one antenna port p is allocated and the power of other antenna ports is 0, the system function of equation (1) can be written as:

$$y_{DM-RS} = h_{p,i} a_{p,i} + n. \quad (5)$$

The estimated noise and interference covariance matrix for the allocated port p may be expressed as:

$$R_{p,i} = E\left((\hat{h}_{p,i} - \tilde{h}_{p,i})(\hat{h}_{p,i} - \tilde{h}_{p,i})^H\right) \quad (6)$$

$$= \frac{1}{SF} R_{nn}$$

$$= \frac{1}{SF}(R_{IC} + \sigma^2_{wgn} I)$$

where SF if the spreading gain or spreading factor of the used OCC, which is 2 in the present case, $R_{nn}$ is the interference and noise covariance matrix to be calculated, $R_{IC}$ is the covariance matrix of the interfering cells, $\sigma_{wgn}$ is the power of the additive white Gaussian noise (AWGN) and I is a unity matrix having the same size as the interference and noise covariance matrix and the covariance matrix of the interfering cells.

The estimated noise and interference covariance matrix for the unallocated port q may be expressed as:

$$R_{q,i} = E\left(\hat{h}_{q,i} \hat{h}_{q,i}^H\right) = \frac{1}{SF} R_{nn}. \quad (7)$$

Although no signal is present in antenna port q, the method at 605 of FIG. 6 uses the presence of the noise subspace in the unused code to estimate the covariance matrix. The estimated interference and noise covariance matrix $\hat{R}_e$ may be calculated as the sum of $R_{p,i}$ and $R_{q,i}$ as in equation (4).

In a MU-MIMO case there is always at least one allocated antenna port p and at least one non-allocated antenna port q, which is possibly allocated to a co-scheduled UE. By way of example, one allocated antenna port p and three co-scheduled UEs are considered. Assuming that the allocated scrambling ID is 0 and the three co-scheduled UEs are served e.g. as illustrated in FIG. 3, equation (1) can in this case be written as:

$$y_{DM-RS} = h_{p,0} a_{p,0} + h_{q,0} a_{q,0} + h_{p,1} a_{p,1} + h_{q,1} a_{q,1} + n \quad (8)$$

The estimated noise and interference covariance matrix of the allocated antenna port p may be written as:

$$R_{p,0} = E\left((\hat{h}_{p,0} - \tilde{h}_{p,0})(\hat{h}_{p,0} - \tilde{h}_{p,0})^H\right) \quad (9)$$

$$= \frac{1}{SF} R_{nn}$$

$$= \frac{1}{SF}(R_{IC} + \sigma^2_{wgn} I + h_{p,1} h_{p,1}^H + h_{q,1} h_{q,1}^H)$$

The last two terms on the right hand side of equation (9) are noise and interference terms which originate from the non-allocated scrambling ID SCID in both the allocated antenna port p and the non-allocated antenna port q.

The estimated noise and interference covariance matrix of the non-allocated antenna port q may be written as:

$$R_{q,0} = E\left(\hat{h}_{q,0} \hat{h}_{q,0}^H\right) \quad (10)$$

$$= \frac{1}{SF} R_{nn}$$

$$= \frac{1}{SF}(R_{IC} + \sigma^2_{wgn} I + h_{p,1} h_{p,1}^H + h_{q,1} h_{q,1}^H) + h_{q,0} h_{q,0}^H$$

The right-hand side of equation (10) differs from the right-hand side of equation (9) only by the last term which is a noise and interference term which originates from the non-allocated port q with scrambling ID SCID 0.

The noise and interference covariance matrix may in this case be calculated according to equation (4) as the sum of equations (9) and (10). In this case the estimated covariance matrix does not only contain the covariance of the interfering cells but also the covariance of the co-scheduled UEs which allows the receiver to suppress both inter-cell and multi-user interference.

In an implementation of the method 600 the signal may include a third reference signal transmitted from a third antenna port, which is allocated to the UE as is the first antenna port. Despreading and descrambling the signal uses a spreading code associated with the third antenna port and a scrambling sequence assigned to the UE, thereby generating a third antenna port signal. Performing channel estimation of the third antenna port is based on the third antenna port signal, thereby generating a second channel estimate relating to the third antenna port. Further in this implementation estimating an interference and noise covariance measure is based on the first antenna port signal, the first channel estimate relating to the first antenna port, the second antenna port signal, the third antenna port signal and the second channel estimate relating to the third antenna port. In this implementation, the third antenna port may have the same function as the first antenna port. That is, using the third antenna port, a second data stream (layer) may be transmitted to the UE. Here, the spreading code associated with the first antenna port, the spreading code associated with the second antenna port, and the spreading code associated with the third antenna port may e.g. each be orthogonal cover codes (OCC).

In another implementation the method 600 may e.g. include despreading and descrambling the signal using a spreading code associated with a fourth antenna port and the scrambling sequence assigned to the UE, wherein the fourth antenna port is not allocated to the UE, thereby generating a fourth antenna port signal. Here estimating an interference and noise covariance measure main may be performed on the first antenna port signal, the channel estimate relating to the first antenna port, the second antenna port signal, and the fourth antenna port signal.

In this implementation of the method 600 the spreading code associated with the first antenna port, the spreading code associated with the second antenna port, and the spreading code associated with the fourth antenna port may e.g. be orthogonal cover codes (OCC).

The fourth antenna port may e.g. be not allocated to another UE. In this case the power of other antenna ports is zero. This case is also known as SU-MIMO.

In another case the signal may e.g. include a fourth reference signal transmitted from the fourth antenna port, the fourth antenna port being allocated to another UE. This case is also known as MU-MIMO. Method 600 may be the same for these two scenarios, i.e. there may be no discrimination between SU-MIMO and MU-MIMO.

In all cases described above, the spreading codes used by the antenna ports may be signaled to the allocated (i.e. target) UE. However, there may not be any signaling about the mode of operation (SU-MIMO and MU-MIMO) and, in case of MU-MIMO, the number of co-scheduled UEs. The allocated UE may not have knowledge about such information.

Figure 7:
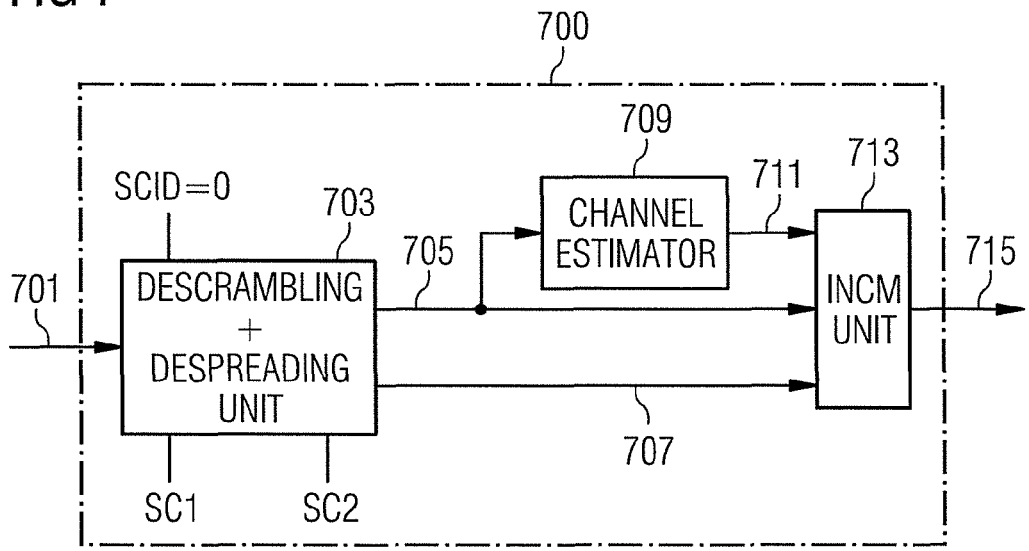
FIG. 7 schematically illustrates an exemplary block diagram of a receiver circuit.

FIG. 7 is a block diagram of a receiver circuit 700 of a UE configured to receive a signal 701 according to the method 600 described with respect to FIG. 6. The receiver circuit 700 may be implemented in a UE or mobile device.

The receiver circuit 700 is configured to receive a signal 701 including a first reference signal transmitted from a first antenna port, wherein the first antenna port is allocated to the UE. The first reference signal may e.g. be a DM-RS, in particular a DM-RS for demodulation of a PDSCH.

The receiver circuit 700 includes a descrambling and despreading unit 703 which is configured to despread and descramble the signal 701 using a spreading code SC1 associated with the first antenna port and a scrambling sequence which may e.g. have a scrambling ID SCID 0 and which is assigned to the UE, thereby generating a first antenna port signal 705. The spreading code SC1 and the scrambling sequence having scrambling ID SCID 0 may e.g. be stored inside the descrambling and despreading unit 703.

Further, the descrambling and despreading unit 703 is configured to despread and descramble the signal 701 using a spreading code SC2 associated with a second antenna port and the scrambling sequence assigned to the UE, wherein the second antenna port is unallocated to the UE, thereby generating a second antenna port signal 707. The spreading code SC2 may also be stored inside the descrambling and despreading unit 703.

The spreading code SC1 associated with the first antenna port and the spreading code SC2 associated with the second antenna port may e.g. be orthogonal cover codes (OCC), e.g. OCC1 and OCC2. The first antenna port may e.g. be antenna port 7 and the second antenna port may e.g. be antenna port 8. The OCC which is used for antenna ports 7 and 8 may e.g. be [+1+1+1+1] for antenna port p=7 and [+1−1+1−1] for antenna port q=8, wherein the spreading factor SF is 2 as the OCC is used for 2 neighboring symbols.

The receiver circuit 700 may further include a channel estimator 709 which is configured to generate a channel estimate 711 relating to the first antenna port based on the first antenna port signal 705. The channel estimation may e.g. be performed in the same way as described in connection with method 600 and FIG. 6.

The receiver circuit 700 may further include a unit 713 which is configured to estimate an interference and noise covariance measure (INCM) 715 based on the first antenna port signal 705, the channel estimate 711 and the second antenna port signal 707. The estimate of the interference and noise covariance measure may e.g. be performed in the same way as described in connection with method 600 of FIG. 6.

Figure 8:
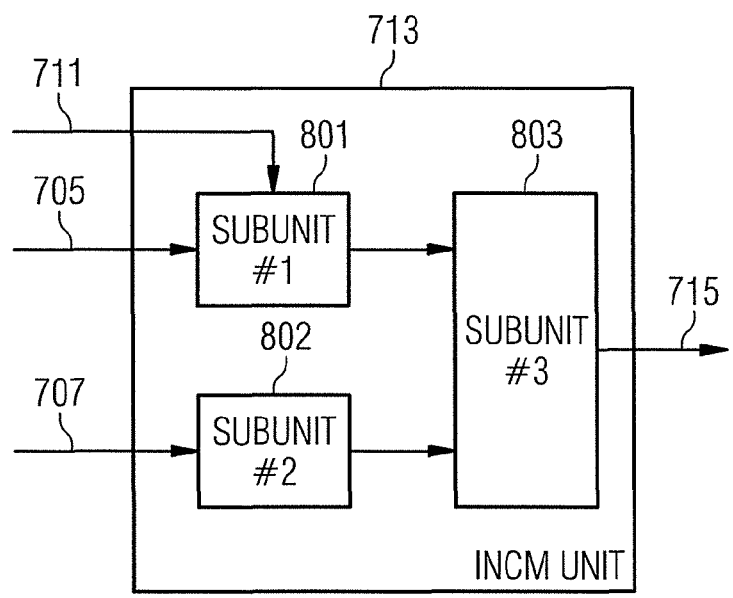
FIG. 8 schematically illustrates an exemplary block diagram of a unit configured to estimate an interference and noise covariance measure.

Further referring to FIG. 8, the unit 713 configured to estimate an interference and noise covariance measure 715 based on the first antenna port signal 705, the channel estimate 711 and the second antenna port signal 707 may include a first sub-unit 801 configured to estimate a first interference and noise covariance measure related to the first antenna port based on the first antenna port signal 705 and the channel estimate 711, a second sub-unit 802 configured to estimate a second interference and noise covariance measure related to the second antenna port based on the second antenna port signal 707, and a third sub-unit 803 configured to combine the first covariance measure and the second covariance measure to obtain the interference and noise covariance measure. The unit 713 may e.g. be configured such that the exemplary method 600 of estimating an interference and noise covariance measure based on the first antenna port signal, the channel estimate and the second antenna port signal may be performed.

The mentioned covariance measures, in particular the interference and noise covariance measure 715 and the first and second interference and noise covariance measures may e.g. be interference and noise covariance matrices.

The receiver circuit 700 may further include a whitening filter (not illustrated), wherein the receiver circuit 700 is configured to adjust the whitening filter based on the interference and noise covariance measure 715. Further, the receiver circuit 700 may further include a linear detector, wherein the receiver circuit 700 is configured to adjust the linear detector based on the interference and noise covariance measure 715.

The third sub-unit 803 configured to combine the first covariance measure and the second covariance measure may e.g. be configured to add the first interference and noise covariance measure and the second interference and noise covariance measure to obtain the interference and noise covariance measure 715.

The receiver circuit 700 may e.g. be configured to receive a single data stream (layer) of the signal 701 which is transmitted from the first antenna port to the receiver circuit 700.

The signal 701 may include a third reference signal transmitted from a third antenna port, wherein the third antenna port is allocated to the UE. In this case, the receiver circuit 700 may e.g. be configured to receive the signal 701, the descrambling and despreading unit 703 may e.g. be configured to despread and descramble the signal 701 using a spreading code SC3 associated with the third antenna port and the scrambling sequence assigned to the UE, thereby generating a third antenna port signal, the channel estimator 709 may be configured to perform channel estimation of the third antenna port based on the third antenna port signal, thereby generating a second channel estimate relating to the third antenna port and the unit 713 configured to estimate an interference and noise covariance measure may be configured to estimate the interference and noise covariance measure 715 based on the first antenna port signal 705, the channel estimate 711, the second antenna port signal 707, the third antenna port signal and the second channel estimate.

The spreading code SC1 associated with the first antenna port, the spreading code SC2 associated with the second antenna port, and the spreading code SC3 associated with the third antenna port may e.g. be orthogonal cover codes (OCC). They may be signaled by the network to the allocated UE.

The receiver circuit 700 may e.g. be configured to receive at least two data streams (layers) of the signal 701 which are transmitted from the first antenna port and the third antenna port to the receiver circuit 700.

The signal may e.g. include a fourth reference signal transmitted from a fourth antenna port, the fourth antenna port being unallocated to the UE. In this case the receiver circuit 700 may be configured to receive the signal, the descrambling and despreading unit 703 may be configured to despread and descramble the signal using a spreading code SC4 associated with a fourth antenna port and the scrambling sequence assigned to the UE, thereby generating a fourth antenna port signal, and the unit 713 configured to estimate an interference and noise covariance measure may be configured to estimate the interference and noise covariance measure 715 based on the first antenna port signal 705, the channel estimate 711, the second antenna port signal 707, and the fourth antenna port signal.

The spreading code SC1 associated with the first antenna port, the spreading code SC2 associated with the second antenna port, and the spreading code SC4 associated with the fourth antenna port may e.g. be orthogonal cover codes (OCC). They may be signaled by the network to the allocated UE.

Figure 9:
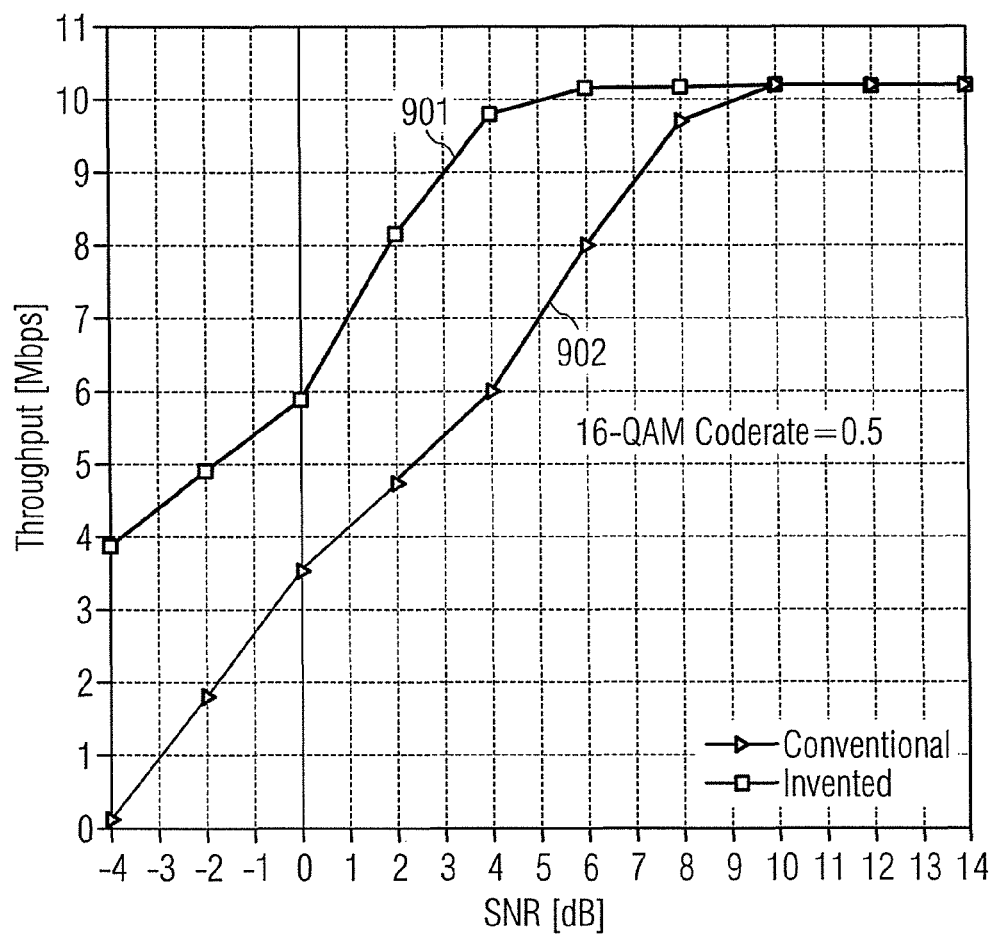
FIGS. 9 and 10 are graphs illustrating the performances of receiver circuits.
Figure 10:
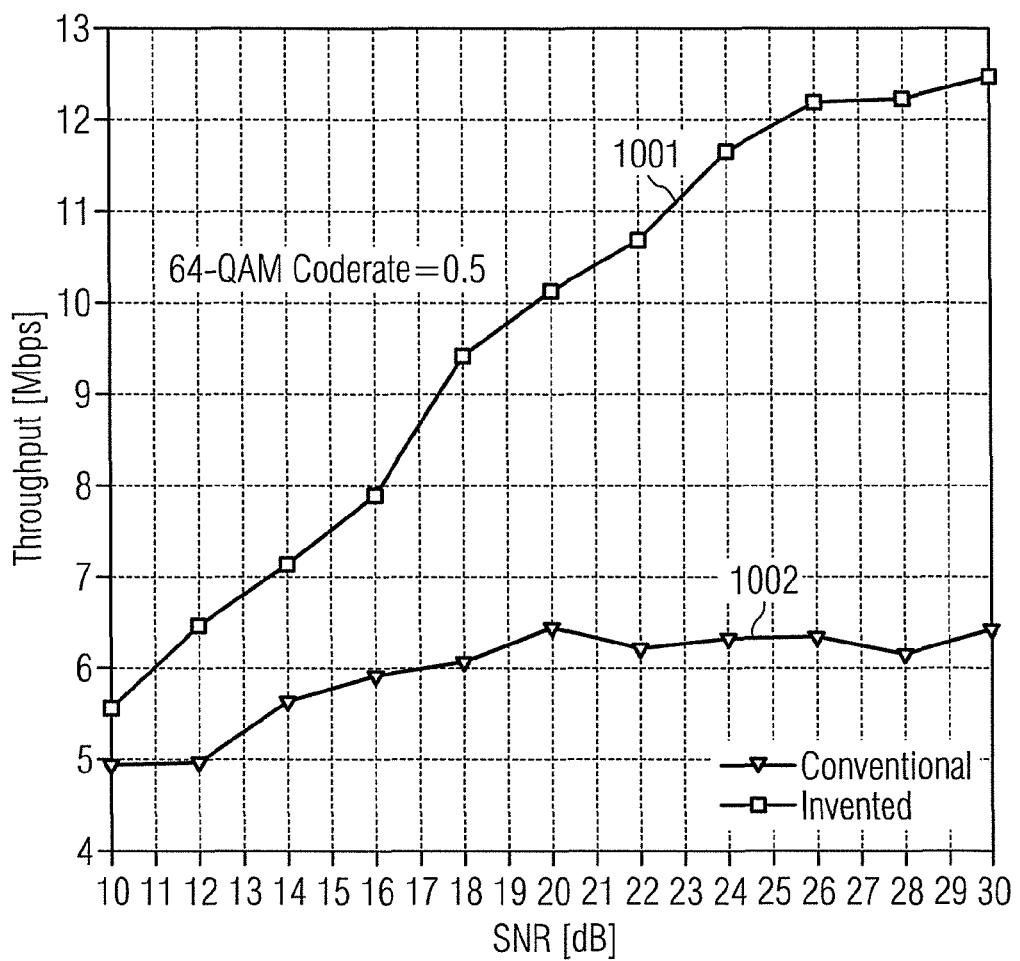

FIGS. 9 and 10 are graphs which illustrate exemplary performances of the receiver circuit 700 as depicted in FIG. 7 or the method 600 as depicted in FIG. 6. FIG. 9 shows a receiver performance for SU-MIMO with one interfering cell and FIG. 10 shows the receiver performance for MU-MIMO with 3 co-scheduled UEs and one interfering cell. In both FIG. 9 and FIG. 10 the performance of the receiver circuit 700 is compared with a prior art performance in accordance with method which was published in R1-094078, "Discussion on DM-RS for enhanced DL beamforming", 3GPP TSG RAN WG1 #58bis.

FIG. 9 illustrates the throughput of the receiver circuit 700 in units of Mbps versus the SNR (signal-to-noise ratio) for transmission of one layer using a 2×2 SU-MIMO system with low correlation implementing an LTE PDSCH channel for DM-RS with 10 MHz bandwidth, a 16-QAM modulation with a 16-QAM code rate of 0.5, an EVA 70 Hz channel (EVA: extended vehicular A channel according to 3GPP definitions), one interfering cell, and an INR (interference-to-noise ratio) of 10 dB.

The results shown in FIG. 9 were computed by simulation based on the parameters shown in Table 1:

TABLE 1

Parameters used for the receiver circuit 700

| Parameter | Value |
| --- | --- |
| Bandwidth | 10 MHz |
| System Configuration (TX × RX) | 2 × 2 |
| Channel Model | EVA 70 Hz |
| Interference-to-Noise Ratio (INR) | 10 dB |
| Transmission Mode | TM8 and TM9 |

The first (uppermost) curve 901 shows the achievable data throughput of the receiver circuit 700 as depicted in FIG. 7 or the method 600 as depicted in FIG. 6. The second (lowermost) curve 902 shows the data throughput of the prior art method mentioned above for the same parameters. In the region between −4 and 4 dB curve 901 shows a data throughput which is more than 4 dB higher than the corresponding data throughput of curve 902 according to the compared prior art method.

FIG. 10 illustrates the throughput of the receiver circuit 700 in units of Mbps versus the SNR for transmission of one layer using a 4×2 MU-MIMO system with one allocated UE and three co-scheduled UEs with medium correlation implementing an LTE PDSCH channel for DM-RS with 10 MHz bandwidth, a 64-QAM modulation with a 64-QAM code rate of 0.5, an EVA 5 Hz channel, one interfering cell, and an INR of 10 dB.

The results shown in FIG. 10 were computed by simulation based on the parameters shown in Table 2:

TABLE 2

Parameters used for the receiver circuit 700

| Parameter | Value |
| --- | --- |
| Bandwidth | 10 MHz |
| System Configuration (TX × RX) | 4 × 2 |
| Channel Model | EVA 5 Hz |
| Interference to Noise Ratio (INR) | 10 dB |
| Transmission Mode | TM8 and TM9 |

The first (uppermost) curve 1001 shows the achievable data throughput of the receiver circuit 700 as depicted in FIG. 7 or the method 600 as depicted in FIG. 6. The second (lowermost) curve 1002 shows the data throughput of the prior art method mentioned above for same parameters. In the region at higher SNR the curve 1001 shows a data throughput which is more than 4 dB higher than the corresponding data throughput of curve 1002 according to the compared prior art method.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method of estimating interference and noise in a multiple input multiple output (MIMO) receiver of a user equipment (UE), comprising:
   receiving a signal at the UE comprising a first reference signal transmitted from a first antenna port, the first antenna port being allocated to the UE;
   despreading and descrambling the signal using a spreading code associated with the first antenna port and a scrambling sequence assigned to the UE, thereby generating a first antenna port signal;
   despreading and descrambling the signal using a spreading code associated with a second antenna port and the scrambling sequence assigned to the UE, the second antenna port being unallocated to the UE, thereby generating a second antenna port signal;
   performing channel estimation using a channel estimator of the first antenna port based on the first antenna port signal, thereby generating a channel estimate relating to the first antenna port; and
   estimating an interference and noise covariance measure based on the first antenna port signal, the channel estimate and the second antenna port signal.

2. The method of claim 1, further comprising:
   estimating a first interference and noise covariance measure related to the first antenna port based on the first antenna port signal and the channel estimate;

estimating a second interference and noise covariance measure related to the second antenna port based on the second antenna port signal; and combining the first covariance measure and the second covariance measure to obtain the interference and noise covariance measure.

3. The method of claim 1, wherein the second antenna port is not allocated to another UE.

4. The method of claim 1, wherein the signal further comprises a second reference signal transmitted from the second antenna port, the second antenna port being allocated to another UE.

5. The method of claim 1, wherein the first reference signal is a demodulation reference signal (DM-RS) for demodulation of a physical downlink shared channel (PDSCH).

6. The method of claim 1, wherein the spreading code associated with the first antenna port and the spreading code associated with the second antenna port are orthogonal cover codes (OCC).

7. The method of claim 2, wherein combining comprises adding the first interference and noise covariance measure and the second interference and noise covariance measure.

8. The method of claim 1, wherein a single data stream of the signal is transmitted from the first antenna port to the UE.

9. The method of claim 1, wherein the received signal further comprises a third reference signal transmitted from a third antenna port, the third antenna port being allocated to the UE;

despreading and descrambling the signal using a spreading code associated with the third antenna port and the scrambling sequence assigned to the UE, thereby generating a third antenna port signal;

performing channel estimation of the third antenna port based on the third antenna port signal, thereby generating a second channel estimate relating to the third antenna port; and estimating an interference and noise covariance measure based on the first antenna port signal, the channel estimate, the second antenna port signal, the third antenna port signal and the second channel estimate.

10. The method of claim 9, wherein the spreading code associated with the first antenna port, the spreading code associated with the second antenna port, and the spreading code associated with the third antenna port are orthogonal cover codes (OCC).

11. The method of claim 9, wherein the received signal comprises at least two data streams which are transmitted to the UE, wherein at least one data stream is transmitted from the first antenna port and at least one other data stream is transmitted from the third antenna port.

12. The method of claim 1, further comprising:

despreading and descrambling the signal using a spreading code associated with a fourth antenna port and the scrambling sequence assigned to the UE, the fourth antenna port being unallocated to the UE, thereby generating a fourth antenna port signal;

estimating an interference and noise covariance measure based on the first antenna port signal, the channel estimate, the second antenna port signal, and the fourth antenna port signal.

13. The method of claim 12, wherein the spreading code associated with the first antenna port, the spreading code associated with the second antenna port, and the spreading code associated with the fourth antenna port are orthogonal cover codes (OCC).

14. The method of claim 12, wherein the fourth antenna port is not allocated to another UE.

15. The method of claim 12, wherein the signal further comprises a fourth reference signal transmitted from the fourth antenna port, the fourth antenna port being allocated to another UE.

16. The method of claim 1, wherein the UE is compatible with a LTE network or a LTE-Advanced network.

17. The method of claim 2, wherein estimating the second interference and noise covariance measure related to the second antenna port is independent of whether or not the second antenna port is allocated to another UE.

18. A receiver circuit of a user equipment (UE), configured to receive a signal comprising a first reference signal transmitted from a first antenna port, the first antenna port being allocated to the UE, the receiver circuit comprising:

a descrambling and despreading unit configured to despread and descramble the received signal using a spreading code associated with the first antenna port and a scrambling sequence assigned to the UE, thereby generating a first antenna port signal, and configured to despread and descramble the received signal using a spreading code associated with a second antenna port and the scrambling sequence assigned to the UE, the second antenna port being unallocated to the UE, thereby generating a second antenna port signal;

a channel estimator configured to generate a channel estimate relating to the first antenna port based on the first antenna port signal; and an estimation unit configured to estimate an interference and noise covariance measure based on the first antenna port signal, the channel estimate and the second antenna port signal.

19. The receiver circuit of claim 18, wherein the estimation unit configured to estimate an interference and noise covariance measure comprises:

a first sub-unit configured to estimate a first interference and noise covariance measure related to the first antenna port based on the first antenna port signal and the channel estimate;

a second sub-unit configured to estimate a second interference and noise covariance measure related to the second antenna port based on the second antenna port signal; and a third sub-unit configured to combine the first covariance measure and the second covariance measure to obtain the interference and noise covariance measure.

20. The receiver circuit of claim 18, further comprising:
a whitening filter, wherein the receiver circuit is configured to adjust the whitening filter based on the estimated interference and noise covariance measure.

21. The receiver circuit of claim 18, further comprising:
a linear detector, wherein the receiver circuit is configured to adjust the linear detector based on the estimated interference and noise covariance measure.

22. The receiver circuit of claim 19, wherein the third sub-unit comprises an adder.

23. The receiver circuit of claim 19, wherein the second sub-unit is configured to operate independent of whether or not the second antenna port is allocated to another UE.

24. The receiver circuit of claim 18, wherein the received signal further comprises a third reference signal transmitted from a third antenna port, the third antenna port being allocated to the UE, and wherein the descrambling and despreading unit is configured to despread and descramble the signal using a spreading code associated with the third antenna port and the scrambling sequence assigned to the UE, thereby generating a third antenna port signal;

the channel estimator is configured to perform channel estimation of the third antenna port based on the third antenna port signal, thereby generating a second channel estimate relating to the third antenna port; and the estimation unit configured to estimate an interference and noise covariance measure is configured to estimate the interference and noise covariance measure based on the first antenna port signal, the channel estimate, the second antenna port signal, the third antenna port signal and the second channel estimate.

25. The receiver circuit of claim 18, wherein the received signal further comprises a fourth reference signal transmitted from a fourth antenna port, the fourth antenna port being unallocated to the UE;

the descrambling and despreading unit is configured to despread and descramble the signal using a spreading code associated with the fourth antenna port and the scrambling sequence assigned to the UE, thereby generating a fourth antenna port signal; and the estimation unit configured to estimate an interference and noise covariance measure is configured to estimate the interference and noise covariance measure based on the first antenna port signal, the channel estimate, the second antenna port signal, and the fourth antenna port signal.

\* \* \* \* \*